US012499442B2

(12) United States Patent
Rossi et al.

(10) Patent No.: US 12,499,442 B2
(45) Date of Patent: Dec. 16, 2025

(54) ONLINE SYSTEMS USING CURRENCY AT ACCESS DEVICE

(71) Applicant: Visa International Service Association, San Francisco, CA (US)

(72) Inventors: Rafael Rossi, Miami, FL (US); Kiria Habel, Miami, FL (US); Lee Araujo Martinez, Miami, FL (US); Victor Robles, Miami, FL (US); Hermes Godoy, Miami, FL (US); Pablo Campos Garcia-Hirschfeld, Miami, FL (US); Valentina Navarro, Miami, FL (US)

(73) Assignee: Visa International Service Association, San Francisco, CA (US)

( * ) Notice: Subject to any disclaimer, the term of this patent is extended or adjusted under 35 U.S.C. 154(b) by 119 days.

(21) Appl. No.: 17/793,347

(22) PCT Filed: Jan. 29, 2020

(86) PCT No.: PCT/US2020/015585
§ 371 (c)(1),
(2) Date: Jul. 15, 2022

(87) PCT Pub. No.: WO2021/154234
PCT Pub. Date: Aug. 5, 2021

(65) Prior Publication Data
US 2023/0056521 A1    Feb. 23, 2023

(51) Int. Cl.
*G06Q 20/38* (2012.01)
*G06Q 20/02* (2012.01)
*G06Q 20/40* (2012.01)

(52) U.S. Cl.
CPC ......... *G06Q 20/385* (2013.01); *G06Q 20/027* (2013.01); *G06Q 20/3827* (2013.01); *G06Q 20/401* (2013.01); *G06Q 2220/00* (2013.01)

(58) Field of Classification Search
CPC .......... G06Q 20/385; G06Q 20/00–425; H04L 9/00–50
(Continued)

(56) References Cited

U.S. PATENT DOCUMENTS 8,275,714 B2   9/2012   Eugenio
8,851,366 B2   10/2014  Modi
(Continued)

FOREIGN PATENT DOCUMENTS

KR    20070005407       1/2007
WO    WO-2013028910 A2 * 2/2013   ........... G06Q 20/325

OTHER PUBLICATIONS

Application No. PCT/US2020/015585, International Search Report and Written Opinion, Mailed On Oct. 27, 2020, 12 pages.
(Continued)

*Primary Examiner* — Ari Shahabi
(74) *Attorney, Agent, or Firm* — Kilpatrick Townsend & Stockton LLP (57) ABSTRACT

Systems and methods of completing transactions with currency are described. One method includes receiving, by a server computer, an identifier request message with a transaction amount for a transaction with a user from a resource provider computer. The server computer sends to the resource provider computer an identifier response message with a one-time identifier. The user provides currency, such as physical currency, and the one-time identifier to an access device, or an operator associated with the access device. The server computer then receives an authorization request message including the transaction amount and the one-time identifier from the access device. The server computer associates the identifier request message with the authorization request message using the one-time identifier and sends, an authorization response message to the access
(Continued)

device. The server computer then sends a transaction completion message to the resource provider computer.

18 Claims, 6 Drawing Sheets

(58) Field of Classification Search
USPC .......................................................... 705/75
See application file for complete search history.

(56) References Cited

U.S. PATENT DOCUMENTS

| 2009/0104888 | A1 | 4/2009 | Cox |
| 2012/0290477 | A1 | 11/2012 | Clausen et al. |
| 2014/0067662 | A1* | 3/2014 | Miller ................. G06Q 20/385 |
| | | | 705/39 |
| 2014/0156435 | A1 | 6/2014 | Rahman et al. |
| 2016/0301683 | A1* | 10/2016 | Laxminarayanan .... H04L 67/02 |
| 2017/0178137 | A1* | 6/2017 | Pachouri ............. H04L 63/0838 |

OTHER PUBLICATIONS

Application No. CN202080094511.8 , Office Action, Mailed on Oct. 30, 2024, 25 pages with English Language Summary.
Application No. CN202080094511.8 , Office Action, Mailed on May 10, 2025, 22 pages with English translation.
IN202247047853 , "First Examination Report", May 14, 2025, 6 pages.
Application No. CN202080094511.8 , Office Action, Mailed On Jul. 26, 2025, 26 pages with English translation.

* cited by examiner

Thank you for your purchase on amazon.com! It is for a total of $1,890.80 MXN and has been made on September 26, 2019.

You can pay with cash at any of our participating establishments.

Reference code to pay:
4567-7890-3919-1132

Expires on 09.28.2019

ONLINE SYSTEMS USING CURRENCY AT ACCESS DEVICE

CROSS-REFERENCES TO RELATED APPLICATIONS

This application is a US National Phase application based on PCT Application No. PCT/US2020/015585, filed on Jan. 29, 2020, the contents of which are incorporated by reference in their entirety for all purposes.

BACKGROUND

E-commerce makes up a significant proportion of transaction completed daily. However, in order to conduct transactions online, a user typically needs to have a bank account or payment card that can make online purchases. Some users, however, may be unbanked and may not have a bank account or payment card. Unbanked users still have a need to conduct online transactions, but there is currently no effective method for allowing unbanked users to conduct online transactions.

Embodiments address these and other problems individually and collectively.

BRIEF SUMMARY

One embodiment comprises a method that includes receiving, by a server computer, an identifier request message comprising a transaction amount for a transaction from a resource provider computer and sending, by the server computer to the resource provider computer, an identifier response message comprising a one-time identifier. The method also includes receiving, by the server computer, an authorization request message comprising the transaction amount and the one-time identifier from an access device, wherein the authorization request message is responsive to a user providing currency and the one-time identifier to the access device or an operator associated with the access device. The method also includes associating, by the server computer, the identifier request message with the authorization request message using the one-time identifier, sending, by the server computer to the access device, an authorization response message responsive to the association, and sending, by the server computer to the resource provider computer, a transaction completion message.

Another embodiment includes a server computer comprising a processor and a non-transitory computer-readable medium, coupled to the processor, for executing a method that includes receiving an identifier request message comprising a transaction amount for a transaction from a resource provider computer, and sending, to the resource provider computer, an identifier response message comprising a one-time identifier. The method also includes receiving an authorization request message comprising the transaction amount and the one-time identifier from an access device, wherein the authorization request message is responsive to a user providing currency and the one-time identifier to the access device or an operator associated with the access device. The method also includes associating the identifier request message with the authorization request message using the one-time identifier, sending, to the access device, an authorization response message responsive to the association, and sending, to the resource provider computer, a transaction completion message.

Another embodiment comprises a method that includes receiving, by a resource provider computer, a transaction request message comprising a transaction amount for a transaction from a user device and sending, by the resource provider computer, an identifier request message comprising the transaction amount to a server computer. The method also includes receiving, by the resource provider computer from the server computer, an identifier response message comprising a one-time identifier and presenting, by the resource provider computer to the user device, the one-time identifier. The method also includes receiving, by the resource provider computer from the server computer, a transaction completion message, responsive to a user providing currency and the one-time identifier to an access device or an operator associated with the access device and completing, by the resource provider computer, the transaction.

Another embodiment includes a resource provider computer comprising a processor and a non-transitory computer-readable medium, coupled to the processor, for executing a method that includes receiving a transaction request message comprising a transaction amount for a transaction from a user device, and sending an identifier request message comprising the transaction amount to a server computer. The method also includes receiving, from the server computer, an identifier response message comprising a one-time identifier, and presenting, to the user device, the one-time identifier. The method also includes receiving, from the server computer, a transaction completion message, responsive to a user providing currency and the one-time identifier to an access device or an operator associated with the access device and completing the transaction.

Further details regarding embodiments can be found in the Detailed Description and the Figures.

DETAILED DESCRIPTION

Prior to discussing embodiments, some terms can be described in further detail.

A "user" may include an individual or a computational device. In some embodiments, a user may be associated with one or more personal accounts and/or mobile devices. In some embodiments, the user may be a cardholder, account holder, or consumer.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with each other and other entities. Examples of user devices may include a mobile device, a laptop or desktop computer, a wearable device, etc.

A "resource provider" may be an entity that may make resources available to a user. Examples of resource providers include merchants, vendors, suppliers, owners, traders, and the like. Resource providers may be associated with one or more physical locations (e.g., supermarkets, malls, stores, etc.) and online platforms (e.g., mobile applications, e-commerce websites, online companies, etc.). In some embodiments, resource providers may make available physical items (e.g., goods, products, etc.) to the user. In other embodiments, resource providers may make available digital resources (e.g., electronic documents, electronic files, etc.) to the user. In other embodiments, resource providers may manage access to certain resources (e.g., password, code, etc.) by the user. A "resource provider computer" may include any system associated with a resource provider. In some embodiments, the resource provider computer may handle functionality of a mobile application and/or a website associated with the resource provider from which a user may conduct an online transaction.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated fuel dispensers (AFDs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

A "payment processing network" may be a network that can process messages to facilitate payments. In some embodiments, a payment processing network can include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The payment processing network may include a server computer. The payment processing network may use any suitable wired or wireless network, including the internet.

An "acquirer" may be a financial institution associated with a resource provider. Acquirers typically provide resource providers with a bank account, and in some cases, transaction accepting infrastructure. Generally, after a transaction has been authorized and as part of the settlement process, funds are transferred from the issuer to resource provider's account at the acquirer. The acquirer may also communicate payment transaction status with the resource provider. The acquirer may operate an acquirer computer, which may generically be a transport computer.

An "issuer" may be a financial institution, such as a bank, that creates and maintains financial accounts for account holders. An issuer or issuing bank may issue and maintain financial accounts for consumers. The issuer of a particular consumer account may determine whether or not to approve or deny specific transactions. An issuer may authenticate a consumer and release funds to an acquirer if transactions are approved (e.g., a consumer's account has sufficient available balance and meets other criteria for authorization or authentication).

An "authorization request message" may be a message that is sent to request authorization for a transaction. An authorization request message may be sent, for example to a payment processing network, an issuer of a payment card, a payment processor, a cryptocurrency network, and/or an automated clearing house. An authorization request message according to some embodiments may comply with ISO 8583, which is a standard for systems that exchange electronic transaction information associated with a payment made by a user using a payment device or payment account. An authorization request message may also comprise additional data elements corresponding to "identification information" including, for example, a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be a message reply to an authorization request message. The authorization response message may be generated, for example, by an issuing financial institution, a payment processing network, a cryptocurrency network, a payment processor, and/or an automated clearing house. The authorization response message may include, for example, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "OCT" ("Original Credit Transaction") can be a clearing and settlement credit transaction designed for use in business applications such as a business money transfer or business-to-consumer repayments. Enhanced OCTs can include an authorization message request. OCTs that are not enhanced may not include an authorization message request and may come directly through Base II. The OCT is the transaction used to deliver funds to the recipient account. This timing is to ensure that payment funds are secured before funds are sent to the recipient. The amount of the OCT is the amount agreed by the sender and the service provider in the currency agreed. In some embodiments, the OCT carries only the account number of the recipient and no information about the sender. A special indicator identifies an OCT to the recipient's issuer bank. Client-to-client fees can flow from the submitting acquirer to the recipient's issuer, as in a normal purchase transaction.

A "token" may be a substitute value for a credential. A token may be a string of numbers, letters, or any other suitable characters. Examples of tokens include payment tokens, access tokens, personal identification tokens, etc.

A "one-time identifier" can be an identifier whose use is limited to a single transaction. For example, a one-time identifier may be tied to a particular transaction and may be limited to that particular transaction. In some embodiments, a one-time identifier can be credentials for a transaction. In some embodiments, a one-time identifier may be a token. The one-time identifier may be formatted as other payment credentials (e.g., as a PAN).

An "application program interface" ("API") may refer to a set of routines, protocols, or tools for building software applications. An API can be a set of clearly defined methods of communication and interaction among various programming components. A single API can have multiple implementations (or none, being abstract) in the form of different libraries that share the same programming interface. An API may include specifications for routines, data structures, object classes, variables, or remote calls. Some examples of APIs include POSIX, Windows API, and ASPI. An API can be related to a software library. An API can describe and prescribe the specification while the library is an actual implementation of this set of rules.

Figure 1:
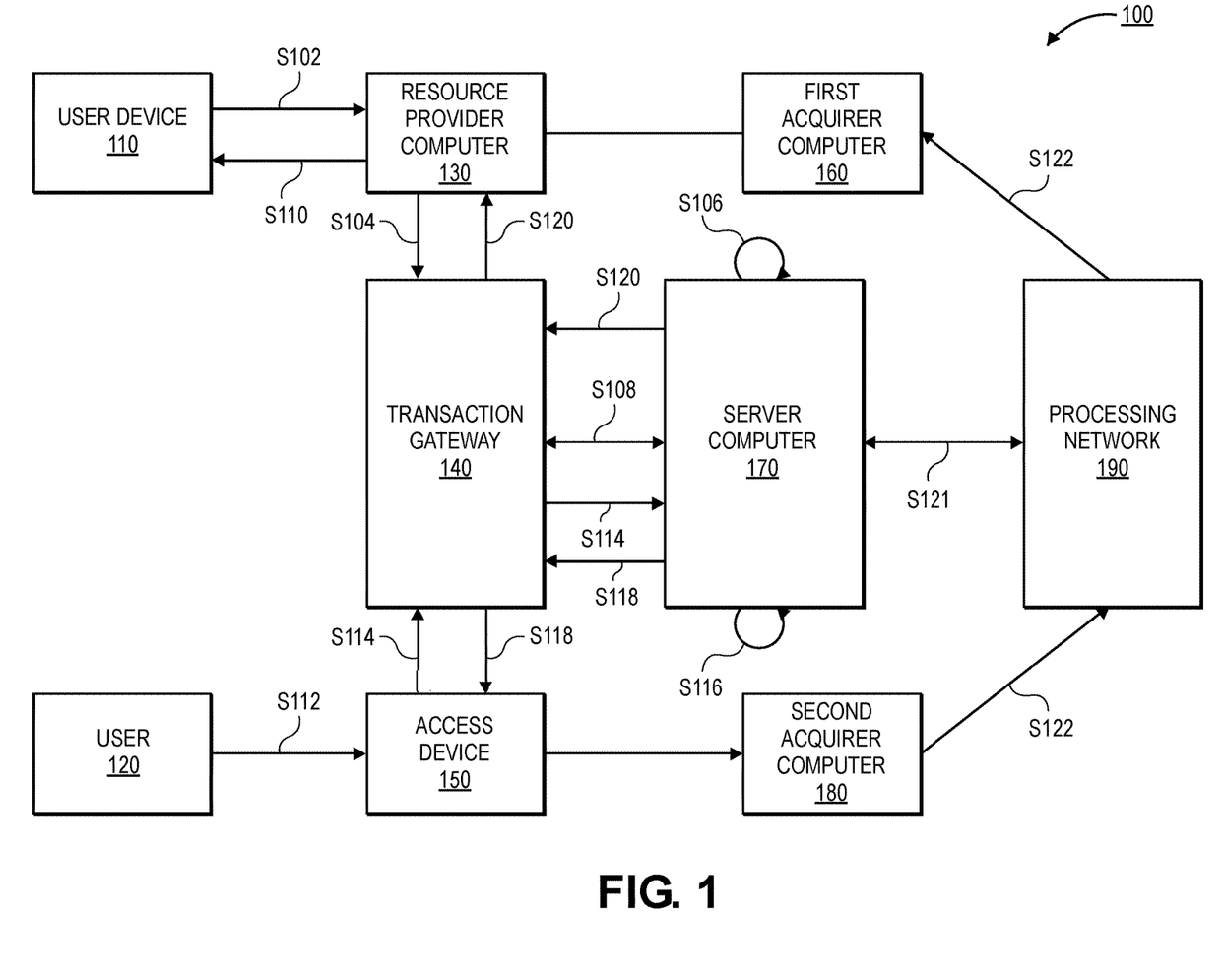
FIG. 1 shows a block diagram and flow diagram according to embodiments.

FIG. 1 shows a block diagram of a system 100 according to embodiments. The system 100 can comprise a user device 110 operated by a user 120. The system 100 may also comprise a resource provider computer 130 associated with a first acquirer computer 160 and an access device 150 associated with a second acquirer computer 180. The resource provider computer 130 and the access device 150 may communicate with a server computer 170 via a transaction gateway 140. The server computer 170, the first acquirer computer 160, and the second acquirer computer 180 may all communicate with a processing network 190. Any of the devices of system 100 may be in operative communication via a suitable communication network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. The parties may communicate with each other and the ledgers via secure and authenticated communication channels.

User device 110 may be a computing device (e.g., a laptop, a smartphone) operated by user 120. In some embodiments, user device 110 may connect to resource provider computer 130 through a website of the resource provider, or through a mobile application of the resource provider on the user device 110. In some embodiments, user 120 may be an unbanked user that does not have a payment account with a bank. In other embodiments, user 120 may have a payment account with a bank and may choose not use the financial account.

Resource provider computer 130 may be a computer of a resource provider (e.g., a merchant). The resource provider may provide, for example, goods (e.g., clothing, food), services (e.g., dog-walking services, landscaping services), or digital media (e.g., music, videos) to users. Resource provider computer 130 may communicate via a transaction gateway 140 or by consuming an API for transaction processing services. Resource provider computer 130 may operate a digital storefront such as a website or a mobile application. In some embodiments, the resource provider may also have one or more physical storefronts.

Transaction gateway 140 may be a computer of a transaction management system. Examples of tasks performed by transaction gateway 140 may include processing transactions, detecting fraud, and managing transaction data security. In some embodiments, transaction gateway 140 may provide an interface between resource providers (e.g., resource provider computer 130, access device 150) and server computer 170.

Access device 150 may be a device for accessing transactions in a physical location. In some embodiments, access device 150 may be a point of sale (POS) terminal or ATM. In some embodiments, access device 150 and resource provider computer 130 may be operated by the same resource provider. In other embodiments, access device 150 may be associated with a merchant computer that is distinct and different from resource provider computer 130. For example, access device 150 may be at a convenience store not associated with resource provider computer 130. Access device 150 may interact with transaction gateway 140 for processing transactions.

First acquirer computer 160 and second acquirer computer 180 may be operated by first and second acquirers, which may be financial or money transmitting entities (e.g., banks) that maintain accounts for resource providers. First acquirer computer 160 may maintain an account for resource provider computer 130, such as a settlement account to deposit sales. Second acquirer computer 180 may maintain an account (e.g., a settlement account) for the resource provider associated with access device 150. In some embodiments, where access device 150 is associated with resource provider computer 130, first acquirer computer 160 and second acquirer computer 180 may be the same.

Server computer 170 may process transactions and one-time identifiers of transactions. In some embodiments, server computer 170 may provide a processing service. In some embodiments, server computer 170 may authorize transactions and perform fraud detection processes. The server computer 170 may be issued a bank identification number (BIN) in some embodiments. The BIN may allow the server computer 170 to meet transaction processing character criteria (e.g., to fit the format of an ISO 8583 message).

Processing network 190 may be a payment processing network. Examples of a payment processing network can include VisaNet. Processing network 190 may route messages and facilitate transactions between other entities connected to the processing network 190. Messages may include authorization messages, clearing messages, and settlement messages.

Figure 2:
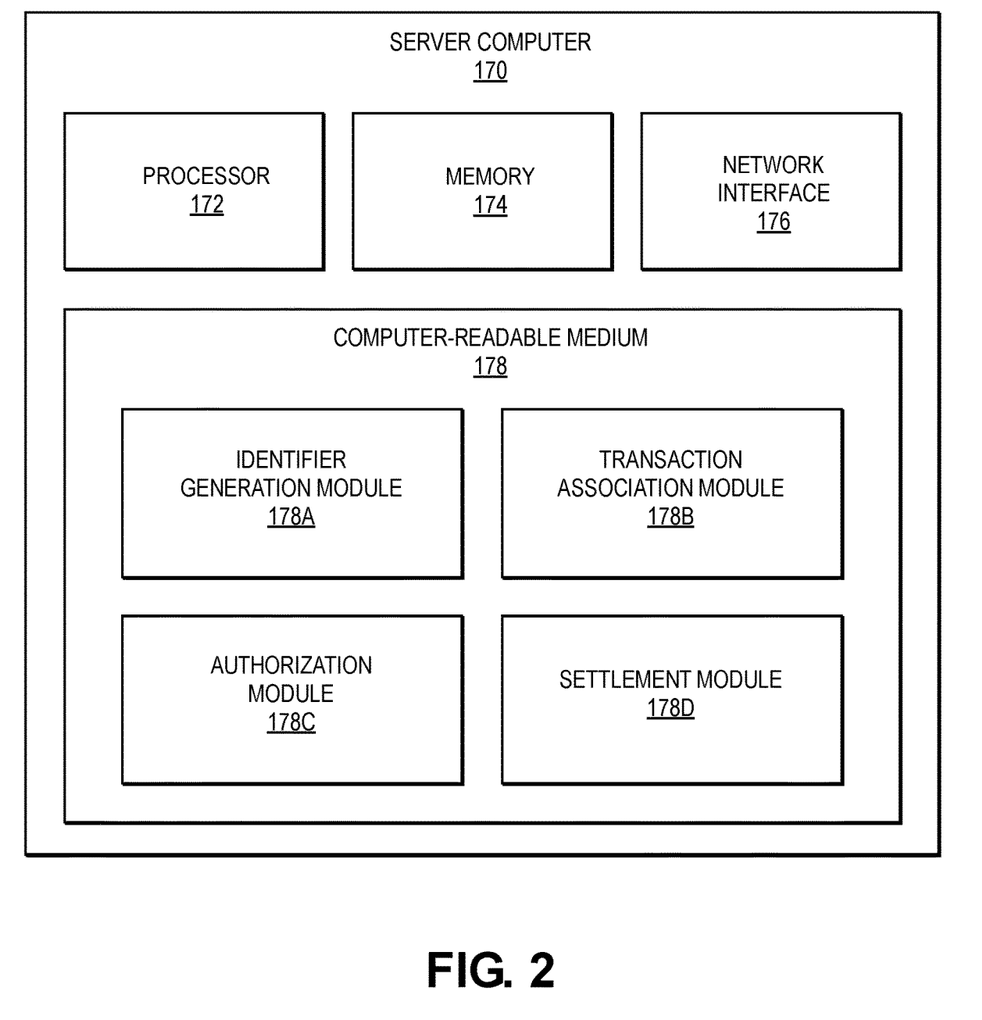
FIG. 2 shows a block diagram of a server computer according to embodiments.

FIG. 2 shows a block diagram of a server computer 170 according to embodiments. Server computer 170 may comprise a processor 172 that is in operative communication with a memory 174, a network interface 176, and a non-transitory computer-readable medium 178. The computer-readable medium may comprise an identifier generation module 178A, a transaction association module 178B, an authorization module 178C, and a settlement module 178D. In some embodiments, server computer 170 may also comprise or be in communication with an identifier database (not pictured).

Processor 172 may be implemented as one or more integrated circuits (e.g., one or more single core or multicore microprocessors and/or microcontrollers). The processor 172 may be used to control the operation of the server computer 170. The processor 172 can execute a variety of programs in response to program code or computer-readable code stored in memory 174. The processor 172 may include functionality to maintain multiple concurrently executing programs or processes.

The memory 174 may be implemented using any combination of any number of non-volatile memories (e.g., flash memory) and volatile memories (e.g., DRAM, SRAM), or any other non-transitory storage medium, or a combination of media.

Network interface 176 may be configured to connect to one or more communication networks to allow server computer 170 to communicate with other entities such as transaction gateway 140, processing network 190, etc. For example, communication with the transaction gateway 140 can be direct, indirect, and/or via an API.

Computer-readable medium 178 may comprise one or more non-transitory media for storage and/or transmission. Suitable media include, as examples, a random access memory (RAM), a read only memory (ROM), a magnetic medium such as a hard-drive, or an optical medium such as a CD (compact disk) or DVD (digital versatile disk), flash memory, and the like. The computer-readable medium 178 may be any combination of such storage or transmission devices.

Identifier generation module 178A, in conjunction with the processor 172, may generate one-time identifiers in response to identifier request messages. A one-time identifier may be defined for a particular transaction amount. In some embodiments, the one-time identifier may be a virtual PAN, or follow the format of a virtual PAN, and server computer 170 may function as a virtual issuer. In other embodiments, the one-time identifier may be a hash of information in the identifier request message (e.g., the transaction amount, a time stamp, a message identifier). In some embodiments, the one-time identifier may be formatted as a PAN. In some embodiments, the one-time identifier may be a one-time credential (e.g., associated with a temporary account). In some embodiments, the identifier generation module 178A, in conjunction with the processor 172, may determine a time period that the one-time identifier is valid. For example, the time period may be 12 hours, 3 days, or one week. The one-time identifier may be set to expire after the time period. In some embodiments, the time period may depend on the transaction. For example, the time period for a transaction less than $100 may be one day while the time period for a transaction greater than $1000 may be one week.

Transaction association module 178B, in conjunction with the processor 172, may associate authorization request messages and identifier request messages. Transaction association module 178B, in conjunction with the processor 172, may use a one-time identifier to associate the authorization request messages and identifier request messages. In some embodiments, associating the messages may comprise using the one-time identifier to query an identifier database to retrieve data from the identifier request message (e.g., a transaction amount, merchant name, merchant ID, order number).

Authorization module 178C, in conjunction with the processor 172, may authorize transactions in response to receiving authorization request messages. In some embodiments, authorization module 178C may authorize transactions using stand-in processing. Authorization module 178C, in conjunction with the processor 172, may also generate authorization response messages. In some embodiments, authorization module 178C may send the authorization request message to an authorizing entity and may receive an authorization response message. In some embodiments, authorization module 178C, in conjunction with the processor 172, can receive an authorization request from access device 150, and can generate an OCT message on behalf of the second acquirer computer 180 to credit funds to the one-time identifier (in form of a PAN or one-time credential). Once credited the one-time identifier, resource provider computer 130 can start a check status process, leveraging APIs. Once the one-time credential is credited, resource provider through the payment gateway or the first acquirer computer 160 can submit a full authorization request as resource provider computer 130.

Settlement module 178D, in conjunction with the processor 172, can settle transactions between first acquirer computer 160 and second acquirer computer 180. In some embodiments, settlement module 178D can generate push transactions (e.g., original credit transactions) to credit funds into an account for the first acquirer computer 160 and generate pull transactions (e.g., account funding transactions) to debit funds from second acquirer computer 180 and net funds between acquirers. Settlement module 178D may operate, for example, at the end of each day to settle all transactions that were completed during the day. In some embodiments, settlement module 178D may send transaction information (e.g., transaction amount, account identifiers) to a processing network such as a payment processing network to settle the transaction.

The computer-readable medium 178 may comprise code, executable by the processor 172 to perform a method comprising: receiving an identifier request message comprising a transaction amount for a transaction from a resource provider computer; sending, to the resource provider computer, an identifier response message comprising a one-time identifier; receiving an authorization request message comprising the transaction amount, merchant name, merchant ID, order number, and the one-time identifier from an access device, wherein the authorization request message is responsive to a user providing currency and the one-time identifier to the access device or an operator associated with the access device; associating the identifier request message with the authorization request message using the one-time identifier; sending, to the access device, an authorization response message responsive to the association; and sending to the resource provider computer, a transaction completion message.

Figure 3:
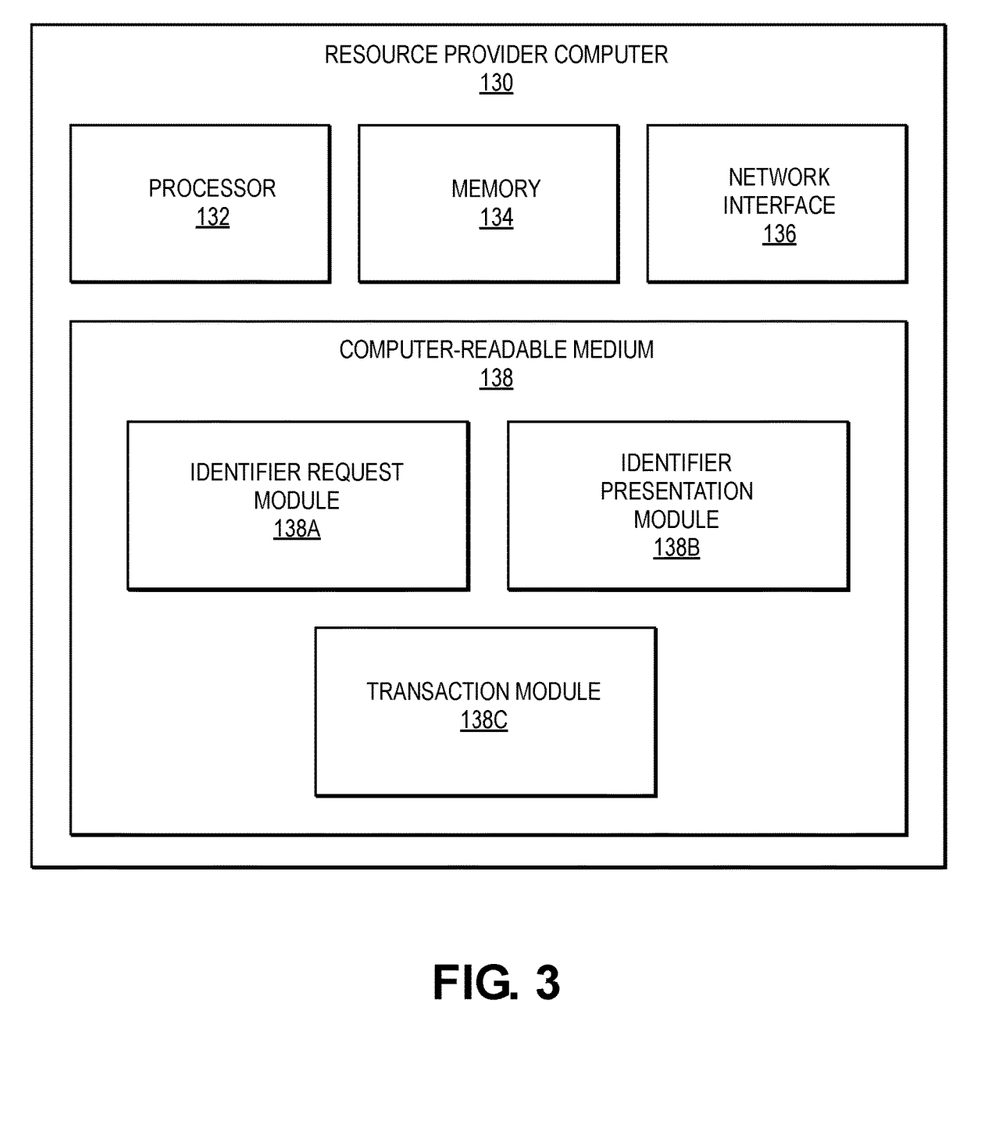
FIG. 3 shows a block diagram of a resource provider computer according to embodiments.

FIG. 3 shows a block diagram of a resource provider computer 130 according to embodiments. Resource provider computer 130 may comprise a processor 132 that is in operative communication with a memory 134, a network interface 136, and a non-transitory computer-readable medium 138. Computer-readable medium 138 may comprise an identifier request module 138A, an identifier presentation module 138B, and a transaction module 138C.

Identifier request module 138A, in conjunction with the processor 132, may generate and send identifier request messages. Identifier request messages may be sent during a transaction in response to a user indicating currency (e.g., physical currency such as cash, digital currency such as a debit or pre-paid card) as a desired payment method. The identifier request message can include the transaction value, a message identifier, and a resource provider identifier. In some embodiments, identifier request module 138A may send the identifier request message to a server computer 170 through a transaction gateway 140 via an API.

Identifier presentation module 138B, in conjunction with the processor 132, can present a one-time identifier to user device 110. In some embodiments, identifier presentation module 138B may display the one-time identifier on, for example, a website or mobile application where the user 120 is completing the transaction. In other embodiments, the identifier presentation module 138B may send the one-time identifier to the user device 110 directly via, for example, a text message or email, or a contactless voucher used on a mobile wallet application. In other embodiments, the identifier presentation module 138B may directly provision the one-time identifier to a mobile application of the resource provider computer 130 on the user device 110. In some embodiments, when the one-time identifier is presented to the user device, it may be in the form of an image (e.g., a barcode, QR code, etc.). The identifier presentation module 138B, in conjunction with the processor 132, may generate the image with the one-time identifier.

Transaction module 138C, in conjunction with the processor 132, may generate and send transaction messages for completing transactions. Transaction module 138C may generate transaction messages with the transaction value, a resource provider identifier, identifiers of the resources involved in the transaction (e.g., a list of items purchased).

The computer-readable medium 178 may also comprise code executable by the processor 132 for performing a method comprising: receiving a transaction request message comprising a transaction amount for a transaction from a user device, sending an identifier request message comprising the transaction amount to a server computer, receiving, from the server computer, an identifier response message comprising a one-time identifier, presenting, to the user device, the one-time identifier, receiving, from the server computer, a transaction completion message, responsive to a user providing currency and the one-time identifier to an access device or an operator associated with the access device, and completing the transaction.

Returning to FIG. 1, a flow diagram according to embodiments can be described.

In step S102, a user 120 may use user device 110 to initiate a transaction with resource provider computer 130. For example, the user 120 may use the user device 110 to browse a website of the resource provider. During the transaction, the user 120 may indicate that they wish to use currency instead of completing the transaction online. In some embodiments, the currency may be physical currency such as cash. In other embodiments, the currency may be digital currency such as a debit card or pre-paid card. In some embodiments, the user device 110 may send a transaction request message to the resource provider computer 130 comprising a transaction amount for the transaction.

In step S104, the resource provider computer 130 can send an identifier request message to a server computer 170. The identifier request message may comprise the transaction amount, a resource provider identifier, a message identifier, a transaction identifier, and details about the transaction (e.g., a list of goods included in the transaction). In some embodiments, the resource provider computer 130 can send the identifier request message to the server computer 170 through transaction gateway 140. Transaction gateway 140 may provide an interface for communicating with server computer 170.

In step S106, the server computer 170 can generate a one-time identifier for the transaction. The one-time identifier may be valid only for the transaction. In some embodiments, the one-time identifier may be formatted as a PAN (e.g., be a 16 digit number). In some embodiments, the one-time identifier may be a virtual PAN, and the server computer 170 may have a bank identification number (BIN) that allows it to issue new PANs. The one-time identifier may also be a one-time credential, issued for currency transactions. In other embodiments, the one-time identifier may be a token. In some embodiments, the server computer 170 may generate the one-time identifier by hashing information in the identifier request message. For example, the server computer 170 may hash the message identifier. In some embodiments, server computer 170 can also generate a verification code. The verification code may be similar to a CVV. In some embodiments, the one-time identifier may only be valid for a time period (e.g., 12 hours, two days, one week). In some embodiments, the time period may depend on the transaction. For example, higher value transactions may have a longer time period. As another example, transactions at a general clothing store may have a time period for the one-time identifier of one day while transactions at a luxury clothing store may have a time period of one week. In some embodiments, after generating the one-time identifier, the server computer 170 may store the one-time identifier in an identifier database. The one-time identifier may be stored with the transaction amount and other information from the identifier request message.

In step S108, the server computer 170 can send an identifier response message comprising the one-time identifier to the resource provider computer 130. The identifier response message may also comprise the time period that the one-time identifier is valid (e.g., as a start time and duration, as an end time) and the verification code. In some embodiments, the server computer 170 may send the identifier response message through transaction gateway 140.

In step S110, the resource provider computer 130 can present the one-time identifier to the user device 110. In some embodiments, the resource provider computer 130 may display the one-time identifier on a website or mobile application of the resource provider on the user device 110. For example, the one-time identifier may be displayed on an order confirmation page. In another embodiment, the resource provider computer 130 can send the one-time identifier to the user device 110, for example, in an email or text message. In some embodiments, the one-time identifier may be presented in plain form (e.g., as a number). In other embodiments, the one-time identifier may be presented as an image (e.g., a QR code, a barcode). In other embodiments, the one-time identifier may be loaded directly on to a mobile application on the user device 110 (e.g., onto a wallet app). While presenting the one-time identifier, the resource provider computer 130 may also present the time period that the one-time identifier, the verification code, and locations where the user 120 can complete the transaction. In some embodiments, other information (e.g., the time period, locations) may be packaged with the one-time identifier (e.g., may be embedded in the same QR code).

In step S112, the user 120 can go to access device 150 and provide currency and the one-time identifier to the access device 150 or an operator associated with the access device 150 (e.g., a store employee). User 120 may also provide the transaction amount in the form of physical currency (e.g., dollar bills) to the access device 150 and/or the verification code. Alternatively, user 120 may provide digital currency such as a debit card or pre-paid card to the access device 150. For example, user 120 may go to an ATM, a convenience store, or a physical location associated with resource provider computer 130. As another example, access device 150 may be a point of sale (POS) terminal operated by an employee. In some embodiments, user 120 may enter the one-time identifier, and the transaction amount, into the access device 150 using a keypad or by giving the information to an operator of the access device 150 who can enter it. In another embodiment, access device 150 may scan an image (e.g., a barcode, a QR code) on the user device 110 and extract the one-time identifier and/or the transaction amount. In another embodiment, send the one-time identifier and/or the transaction amount to the access device 150 may be performed via contactless communication (e.g., NFC, Bluetooth).

In step S114, the access device 150 can send to the server computer 170 an authorization request message comprising the transaction amount and the one-time identifier. The authorization request message may be responsive to the user 120 providing the currency (e.g., physical currency or digital currency). In some embodiments, the access device 150 can send the authorization request message through transaction gateway 140. In other embodiments, the access device 150 can send the authorization request message though second acquirer computer 180. In some embodiments, the authorization request message can include other information such as an identifier of the user 120 (e.g., a phone number, a driver's license number), an access device identifier, and a location of the access device 150. In some embodiments, the authorization request message may be an ISO 8583 message.

In step S116, the server computer 170 can associate the identifier request message with the authorization request message using the one-time identifier. In some embodiments, the server computer 170 can use the one-time identifier to query the identifier database to retrieve the corresponding identifier request message. In some embodiments, the server computer 170 can verify that the one-time identifier has not been used in a previous authorization request message and that the authorization request message was received during the time period that the one-time identifier is valid. Server computer 170 can also verify that the transaction amount in the authorization request message is at least the transaction amount in the identifier request message (e.g., there may be fees that raise the transaction amount in the authorization request message). In some embodiments, the server computer 170 can then authorize the transaction.

For example, the server computer 170 can use stand-in processing. In other embodiments, the server computer 170 can send the authorization request message to an authorizing entity (e.g., first acquirer computer 160). In other embodiments, server computer 170 can receive the authorization request message and generate an OCT on behalf of the second acquirer computer 180 to credit funds into the one time identifier, which can be followed by an authorization request from first acquirer computer 160.

In step S118, the server computer 170 can send to the access device 150 an authorization response message. In some embodiments, the authorization response message can be sent through the second acquirer computer 180. The authorization response message can indicate to the access device 150 whether the transaction is authorized or not. In some embodiments, the authorization response message may have been generated by the server computer 170 in response to associating the identifier request message and the authorization request message and authorizing the transaction. In other embodiments, the authorization response message may be generated by an authorizing entity (e.g., first acquirer computer 160). The authorization response message may comprise an authorization code. In some embodiments, the authorization response message may be an ISO 8583 message. After receiving a positive authorization response message, the access device 150 can notify the user 120 that the transaction in authorized. In some embodiments, the access device 150 can print a receipt with a record of the completed transaction and the transaction amount, merchant name, merchant ID, and/or order number.

In step S120, the server computer 170 can send a transaction completion message to the resource provider computer 130 through the transaction gateway 140. In some embodiments, the transaction completion message may be the authorization response message. The transaction completion message can indicate to the resource provider computer 130 that the currency has been received by the access device 150 or the operator of the access device 150. After receiving the transaction completion message, the resource provider computer 130, can complete the transaction. In some embodiments, completing the transaction can comprise shipping goods to the user 120 or performing a service for the user 120. In other embodiments, completing the transaction may comprise making digital material available to the user 120 (e.g., providing a download link fora film). In some embodiments, the resource provider computer 130 can send a notification (e.g., an email, a text message) to the user device 110 that the transaction is completed.

After step S120, the value of the currency then needs to be transferred to the resource provider associated with the resource provider computer 130. In step S122, the server computer 170 can initiate pulling the transaction amount from the second acquirer computer 180 associated with the access device 150. The server computer 170 can also initiate pushing the transaction amount to the first acquirer computer 160 associated with the resource provider computer 130. In some embodiments, server computer 170 may communicate with processing network 190 (e.g., a payment processing network). For example, in step S121, the server computer 170 can send to processing network 190 the transaction amount and identifiers of resource provider computer 130 (e.g., an account number of the resource provider) and access device 150 (e.g., an account number of a resource provider associated with the access device 150). Alternatively, the server computer 170 can send identifiers (e.g., a BIN) of the first acquirer associated with the first acquirer computer 160 and the second acquirer associated with the second acquirer computer 180.

In some embodiments of the invention, an OCT process can be used. In an OCT process, a service provider (e.g., server computer 170, processing network 190) to a payer's bank (e.g., second acquirer 180) transmits an OCT message to the payee's bank (e.g., first acquirer 160). An OCT (Original Credit Transaction) is typically a clearing and settlement credit transaction designed for use in business applications such as a business money transfer or business-to-consumer repayments. When used in the context of the present invention for money transfer, the OCT is the transaction used to deliver funds to the recipient account. This timing is to ensure that payment funds are secured before funds are sent to the recipient. A settlement process occurs at a later time.

In some embodiments, the OCT carries only the account number of the recipient and no information about the sender. A special indicator can identify an OCT to the recipient's bank. Interchange can flow from the submitting acquirer to the recipient's bank, as in a normal purchase transaction. Settlement can take place within a few days.

Figure 4A:
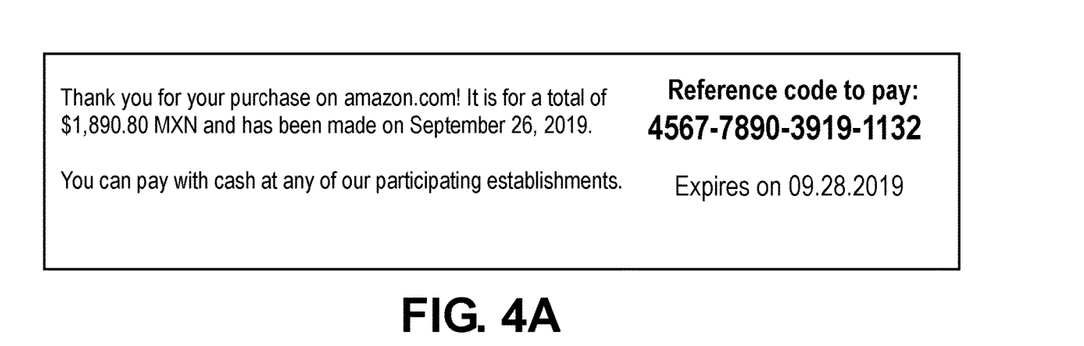
FIG. 4A-D show user interfaces according to embodiments.

FIG. 4A-D show user interfaces and means of communication that may be used in embodiments. FIG. 4A shows a transaction confirmation that a resource provider might use to present a one-time identifier to a user. In some embodiments, the transaction confirmation may be a page of the resource provider's website that is displayed on the user device after the user indicates that they would like to complete the transaction with currency. In other embodiments, the transaction confirmation may be sent to the user device in an email. The transaction confirmation may include the one-time identifier (e.g., "4567-7890-3919-1132"), the transaction amount (e.g., "$1890.80 MXN"), and the date of the transaction (e.g., "Sep. 26, 2019"). The transaction conformation may also include an expiration date for the one-time identifier. In this example, the one-time identifier may be valid for a time period of 2 days and thus may expire on Sep. 28, 2019. The transaction confirmation may also include locations where the user can go to complete the transaction with currency. In some embodiments, the transaction confirmation can designate which locations accept digital currency and which locations accept physical currency.

Figure 4B:
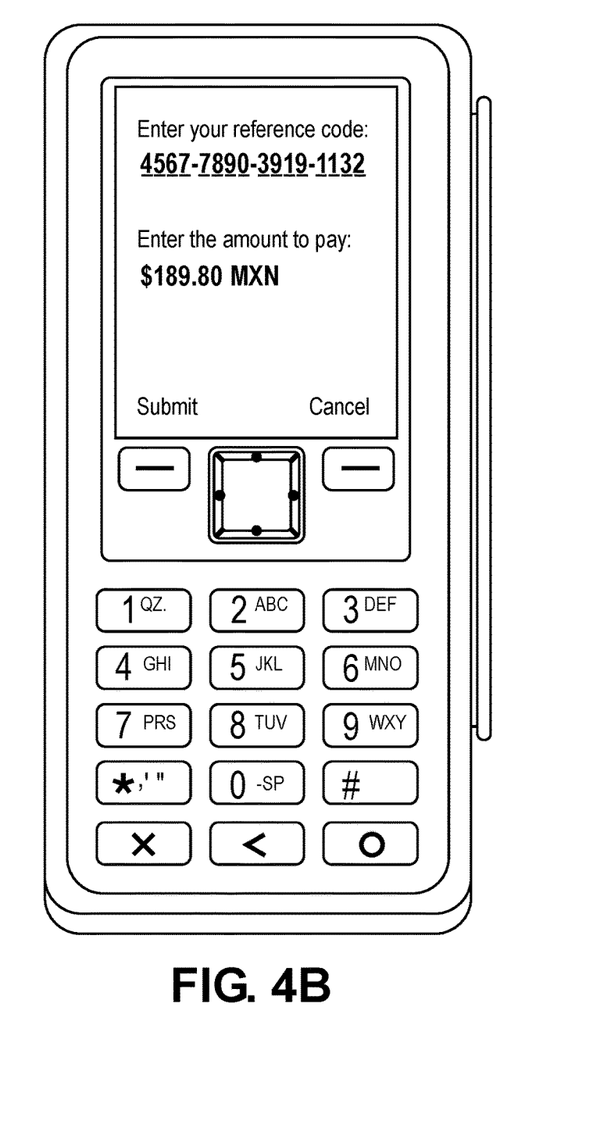

FIG. 4B shows an access device where a user can enter a one-time identifier. In this example, the access device may be a POS terminal. The user can use a key pad of the POS terminal to type in the one-time identifier "4567-7890-3919-1132." The user may also use the key pad to enter the transaction amount "$1890.80 MXN."

Figure 4C:
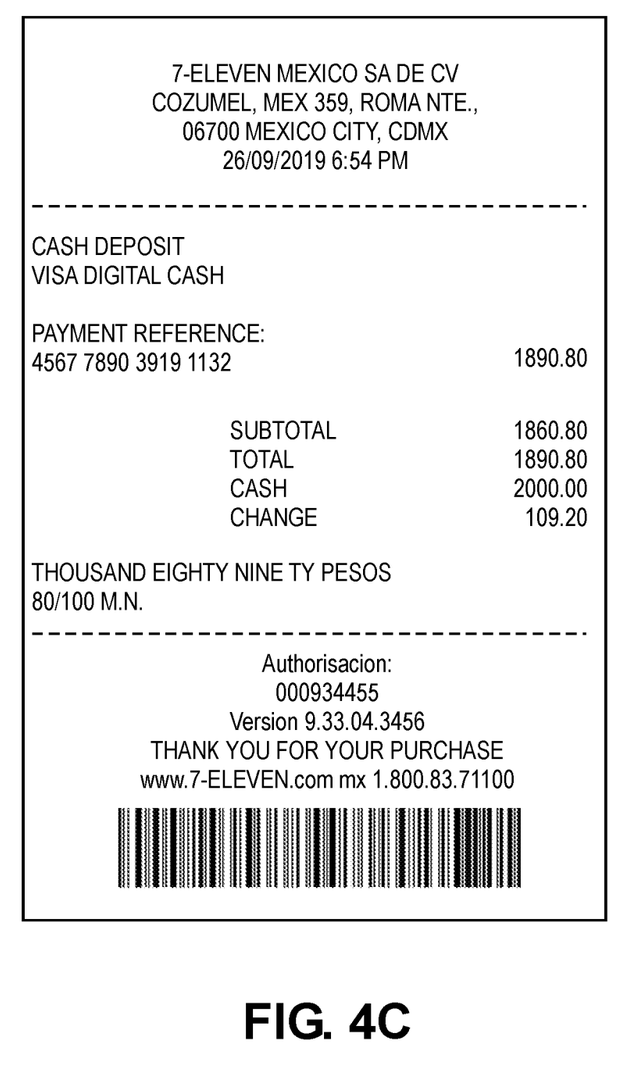

FIG. 4C shows a receipt that may be printed after the access device receives an authorization response message. The receipt can show information including the location of the access device (e.g., 7-Eleven Mexico), the one-time identifier, the transaction amount, resource provider name, an amount of change returned to the user, and a bar code that can be scanned by the access device to retrieve additional information about the transaction (e.g., the authorization request message, the authorization response message) in case of a dispute.

Figure 4D:
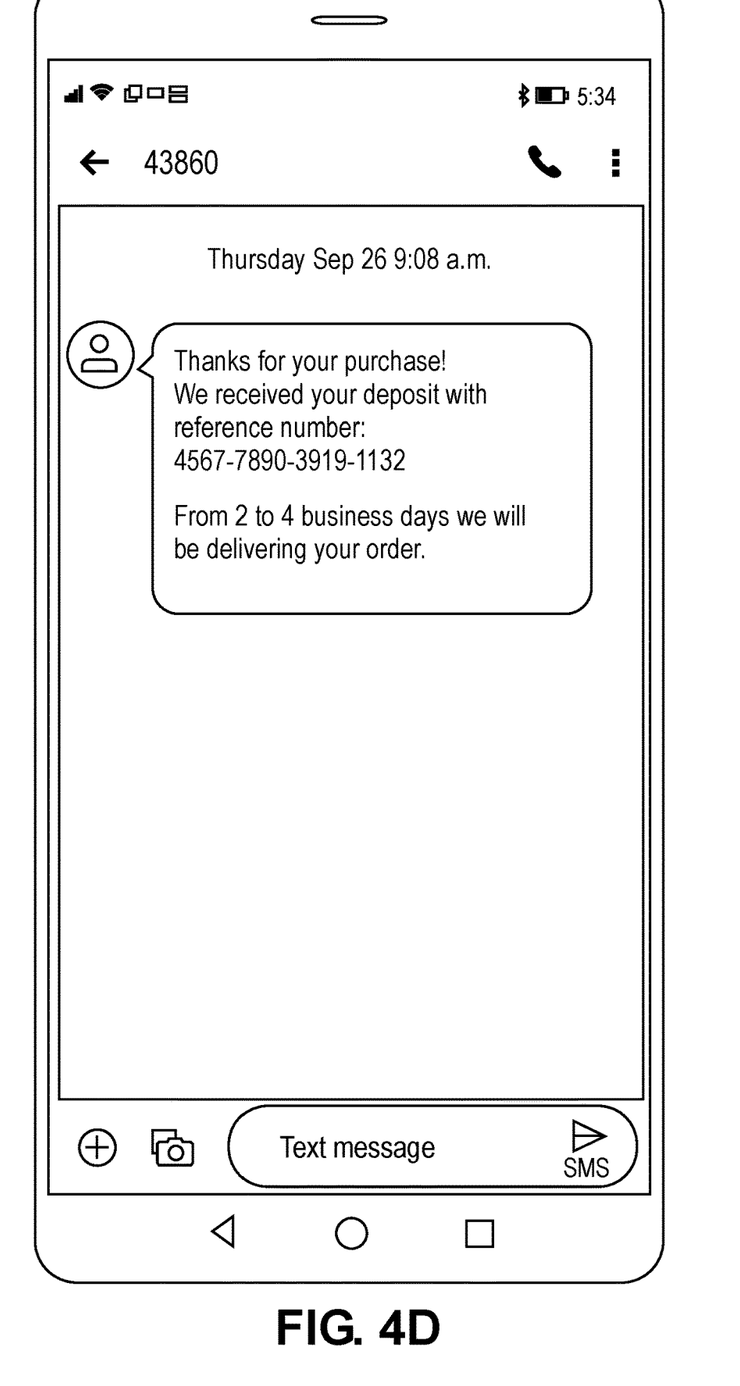

FIG. 4D shows a text message that may be received by the user's user device from a resource provider computer after completing the transaction. The text message may indicate to the user that the payment has been received and that the transaction is complete. The text message may include the one-time identifier and information about completion of the order (e.g., a delivery date, a code for accessing digital media). In other embodiments, a similar message may be sent to the user via email.

Embodiments provide a number of advantages. Embodiments can enable users to make e-commerce purchases domestically or internationally with currency, instead of with an online bank account or credit cards. Embodiments can be used for purchases of entirely digital goods. This can be more convenient for users as acceptance points for physical currency such as an ATM or convenience store POS terminal may not necessarily be associated with the original resource provider that the user is transacting with. Thus, even if the resource provider has limited or no physical presence in an area, a user may have a variety of easy to access locations for completing the transaction in person. Embodiments also provide new functionality to existing access devices without requiring significant modification of the access devices or their methods of communication. For example, the one-time identifier may be formatted as a PAN and the access device can send authorization request messages as for a traditional transaction.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a server computer, an identifier request message comprising at least a transaction amount for a transaction from a resource provider computer operating a resource provider Website, after a user operating a user device interacts with the resource provider Website to conduct the transaction;
   in response to the receiving the identifier request message, generating by the server computer, a one-time identifier as a primary account number comprising a bank identification number (BIN);
   determining, by the server computer, a validity period, during which the one-time identifier is valid based on the transaction amount included in the identifier request message, the determining the validity period comprising, for a greater value of the transaction amount, determining a longer validity period and, for a smaller value of the transaction amount, determining a shorter validity period;

storing, by the server computer in an identifier database, the one-time identifier and the identifier request message;

sending, by the server computer to the resource provider computer, an identifier response message comprising the one-time identifier, the resource provider computer thereafter generating an image with the one-time identifier and loading the image to a mobile application executing on the user device;

scanning, by an access device proximate to the user device at a physical location, the image presented by the mobile application on the user device;

extracting, by the access device, the one-time identifier from the image read from the user device;

receiving, by the server computer, an authorization request message comprising the transaction amount and the one-time identifier from the access device, wherein the authorization request message is an ISO 8583 message, and is generated in response to the access device extracting the one-time identifier from the image;

associating, by the server computer, the identifier request message with the authorization request message using the one-time identifier received in the authorization request message, the associating comprising querying the identifier database using the one-time identifier received in the authorization request message to retrieve the identifier request message and retrieve the transaction amount from the identifier request message;

verifying, by the server computer, the validity period by determining that the authorization request message is received during the validity period associated with the one-time identifier;

based the validity period being verified, sending, by the server computer to the access device, an authorization response message indicating that the transaction is authorized; and sending, by the server computer to the resource provider computer comprising the resource provider Website, a transaction completion message for the transaction.

2. The method of claim 1, further comprising:
pushing, by the server computer, the transaction amount to a first acquirer computer associated with the resource provider computer; and
pulling, by the server computer, the transaction amount from a second acquirer computer associated with the access device.

3. The method of claim 2, wherein pushing the transaction amount is performed with an original credit transaction (OCT).

4. The method of claim 2, wherein the one-time identifier is a one-time credential issued for a currency transaction, wherein pushing the transaction amount comprises loading the one-time credential with the transaction amount.

5. The method of claim 1, wherein the access device is operated by a merchant computer distinct from the resource provider computer.

6. The method of claim 1, wherein the access device and the resource provider computer are operated by a same resource provider.

7. The method of claim 1, wherein the identifier request message is received via a transaction gateway.

8. The method of claim 1, further comprising:
authorizing, by the server computer, the transaction; and
generating, by the server computer, the authorization response message.

9. The method of claim 1, further comprising:
sending, by the server computer, the authorization request message to an authorizing entity; and
receiving, by the server computer, the authorization response message.

10. The method of claim 4, wherein the currency transaction is for physical currency.

11. The method of claim 4, wherein the currency transaction is for digital currency.

12. The method of claim 1, further comprising:
prior to the sending to the access device the authorization response message, verifying, by the server computer, the transaction amount by comparing the transaction amount from the authorization request message with the transaction amount retrieved from the identifier request message; and
determining, by the server computer, that the transaction amount from the authorization request message is not less than the transaction amount retrieved from the identifier request message.

13. A system comprising:
an access device; and
a server computer comprising: a processor and a non-transitory computer-readable medium storing at least one instruction that, when executed by the processor, causes the processor to execute a method including:
receiving an identifier request message comprising at least a transaction amount for a transaction from a resource provider computer operating a resource provider Website, after a user operating a user device interacts with the resource provider Website to conduct the transaction,
in response to the receiving the identifier request message, generating a one-time identifier as a primary account number comprising a bank identification number (BIN),
determining a validity period, during which the one-time identifier is valid based on the transaction amount included in the identifier request message, the determining the validity period including, for a greater value of the transaction amount, determining a longer validity period and, for a smaller value of the transaction amount, determining a shorter validity period,
storing, in an identifier database, the one-time identifier and the identifier request message, and
sending, to the resource provider computer, an identifier response message comprising the one-time identifier, wherein the resource provider computer thereafter generates an image with the one-time identifier and loads the image to a mobile application executing on the user device,
wherein the access device scans the image presented by the mobile application on the user device proximate to the access device at a physical location, and extracts the one-time identifier from the image read from the user device,
wherein the method further includes:
receiving an authorization request message comprising the transaction amount and the one-time identifier from the access device, wherein the authorization request message is an ISO 8583 message, and is generated in response to the access device extracting the one-time identifier from the image, associating the identifier request message with the authorization request message using the one-time identifier received in the authorization request message, the associating including querying the identifier database using the one-time identifier received in the authorization request message to retrieve the identifier request message and retrieve the transaction amount from the identifier request message, verifying the validity period by determining that the authorization request message is received during the validity period associated with the one-time identifier, based the validity period being verified, sending, to the access device, an authorization response message indicating that the transaction is authorized, and sending, to the resource provider computer comprising the resource provider Website, a transaction completion message for the transaction.

14. The system of claim 13, wherein the one-time identifier expires after the validity period.

15. The system of claim 13, wherein the transaction completion message is sent via a transaction gateway.

16. The system of claim 13, wherein the server computer is associated with the bank identification number.

17. The system of claim 13, wherein the identifier database comprises a plurality of one-time identifiers including the one-time identifier and a plurality of identifier request messages including the identifier request message.

18. The system of claim 13, wherein the authorization response message is an ISO 8583 message.

* * * * *